United States Patent [19]

Nicholas

[11] Patent Number: 4,943,605
[45] Date of Patent: Jul. 24, 1990

[54] END DAM NOSING MATERIAL

[75] Inventor: John D. Nicholas, Lawrenceville, Ga.

[73] Assignee: MM Systems Corporation, Tucker, Ga.

[21] Appl. No.: 162,167

[22] Filed: Feb. 29, 1988

[51] Int. Cl.$^5$ ....................... C08L 63/00; C08L 27/06
[52] U.S. Cl. ..................................... 523/438; 523/466; 523/467; 525/108; 525/122; 525/523; 525/502
[58] Field of Search ............... 523/467, 466, 400, 438; 525/108, 122, 523, 502

[56] References Cited

U.S. PATENT DOCUMENTS

| | | | |
|---|---|---|---|
| 3,570,378 | 3/1971 | Honnegger | 94/18 |
| 3,609,116 | 9/1971 | Owen et al. | 523/467 |
| 3,722,379 | 3/1973 | Koester | 404/68 |
| 3,824,025 | 7/1974 | Beutler | 404/48 |
| 3,829,228 | 8/1974 | Miyazaki et al. | 404/68 |
| 3,972,821 | 8/1976 | Weidenbenner et al. | 523/467 |
| 3,981,601 | 9/1976 | Arai | 404/68 |
| 4,285,612 | 8/1981 | Betti | 404/68 |
| 4,362,430 | 12/1982 | Ceintrey | 404/68 |
| 4,501,853 | 2/1985 | Sugimori et al. | 525/122 |
| 4,529,755 | 7/1985 | Nishikawa et al. | 523/212 |

OTHER PUBLICATIONS

Wabocrete FMV-Elastomeric Concrete System; Brochure from Watson Bowman Associates, Inc. of Amherst, N.Y., Catalog No. WB-117, Printed in U.S.A., ]/83.

WABO-DATA; Brochure from Watson-Bowman & Acme Corp. of Gretzville, N.Y., Publication date unknown.

Formulating with DOW Epoxy Resins; Data Sheet from The Dow Chemical Company of Midland, Mich., Form No. 296-383-984; Copyright 1983.

Primary Examiner—Lewis T. Jacobs
Attorney, Agent, or Firm—Jones, Askew & Lunsford

[57] ABSTRACT

An end dam nosing material useful for expansion joints and having high levels of bonding strength, tensile strength, compressive strength, flexural capabilities, resiliency, and resistance to chemical action is disclosed. The end dam nosing material of the present invention does not require the addition of external heat for curing. The end dam nosing material of the present invention comprises a mixture of a dipolymerized elastomer, an epoxy resin, a filler material and an amount of a curing agent effective to cure the epoxy resin and generate sufficient heat to cure the dipolymerized elastomer.

4 Claims, 1 Drawing Sheet

U.S. Patent
Jul. 24, 1990
4,943,605
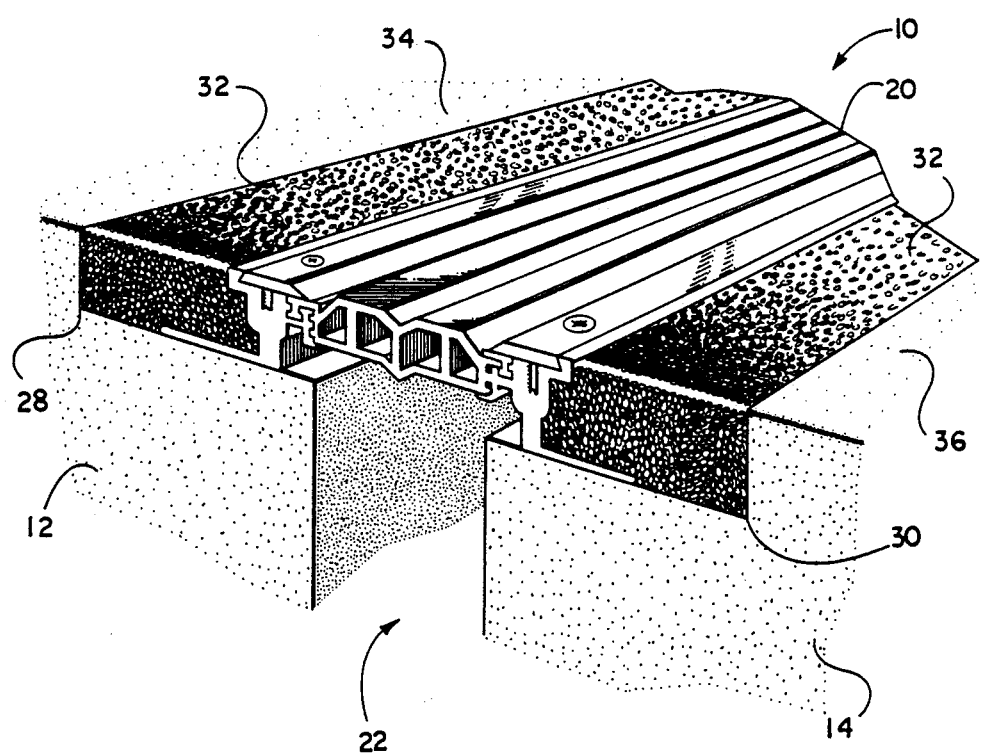

"4,943,605"

END DAM NOSING MATERIAL

TECHNICAL FIELD

This invention relates to an improved end dam nosing material for expansion joints. More particularly, this invention relates to an improved end dam nosing material containing an epoxy resin and a depolymerized elastomer.

BACKGROUND OF THE INVENTION

Concrete structures require a system of joints to provide for expansion and contraction of the concrete caused by fluctuations of the surrounding temperature. Such expansion joints often comprise (1) a bridge device which connects two sections of concrete and (2) an end dam nosing material which fills the channels (also called end dams) between the bridge device and each concrete section. The bridge device must be flexible to adjust to the expansion and contraction of the gap between the concrete sections. The nosing material must ensure a watertight seal between the bridge device and the concrete sections and, in addition, maintain the joint flush with the surface of the concrete.

With concrete parking decks, bridges and road structures, the expansion joints are exposed to weather and repeated impacts from vehicles. These factors can cause the concrete sections and the expansion joints to flex between the supporting members of the concrete sections. Expansion joints are also exposed to corrosive substances such as oil, gasoline, diesel fuel, transmission fluid and the like from those vehicles.

Therefore, the end dam nosing material (also referred to simply as the nosing material) must bond to the concrete and to the bridge device. At the same time, the nosing material must possess a high level of tensile and compressive strengths and flexural capabilities to withstand the expansion and contraction of the concrete and the repeated impacts from the vehicles. Also, the nosing material must possess a high level of chemical resistance to withstand exposure to water, ice, and the corrosive substances from the vehicles.

Concrete and various synthetic resins have previously been used as end dam nosing materials. Concrete has several drawbacks, including brittleness and a tendency to crack and disintegrate under stress. In addition, concrete is not easily produced in batches small enough to be used as an end dam nosing material. Synthetic resins (such as epoxies) possess good bonding capabilities but tend to become brittle and lose flexural capabilities at lower temperatures. Because of the lack of flexural capabilities of concrete and synthetic resins, end dam nosing materials made of those substances tend to crack, debond from the concrete and pop out of the end dams when the expansion joint is subjected to flexural loads.

More flexible synthetic resin mixtures, such as those incorporating polyureides, tend to decompose when exposed to water and chemicals emitted from vehicles. In addition, prior art synthetic resin mixtures require external heat to cure (vulcanizing process). This often involves preheating the components of the nosing material, heating the components as they are combined in a mixer, applying the nosing material to the expansion joint with heated tools and heating the expansion joint until the nosing material cures. The equipment and manpower required to perform all of the heating steps involved in this curing process make the installation of such nosing materials time consuming, awkward and costly.

Therefore, there is a need for an end dam nosing material which is useful for expansion joints and which possesses high levels of bonding strength, tensile strength, compressive strength, flexural capabilities and resistance to chemical action. There is also a need for an end dam nosing material which does not require the application of external heat for curing.

SUMMARY OF THE INVENTION

The present invention comprises an end dam nosing material which is a mixture of a depolymerized elastomer, an epoxy resin and a filler component, together with an amount of a curing agent effective to cure the epoxy resin and generate sufficient heat to cure the depolymerized elastomer.

Surprisingly, the present invention overcomes the drawbacks of the prior art by providing high levels of bonding strength, tensile strength, compressive strength, flexural capabilities and resiliency, while at the same time providing a high level of chemical stability. In addition, the present invention does not require the addition of external heat for curing. When the components of the present invention are mixed, an exothermic reaction occurs which produces sufficient heat for the endothermic curing process to occur.

Therefore, an object of the present invention is to provide an improved end dam nosing material for expansion joints.

Another object of the present invention is to provide an end dam nosing material that remains intact in the end dam when the expansion joint is subjected to a flexural load.

Another object of the present invention is to provide an end dam nosing material that resists cracking and spalling when subjected to the impact of traveling vehicles.

Another object of the present invention is to provide an end dam nosing material that has a high level of bonding strength.

Another object of the present invention is to provide an end dam nosing material that has high levels of compressive and tensile strengths.

Another object of the present invention is to provide an end dam nosing material that has high levels of resiliency and flexural capabilities.

Still another object of the present invention is to provide an end dam nosing material that has a high level of resistance to chemical action.

A further object of the present invention is to provide an end dam nosing material that does not require external heat for curing.

Other objects, features and advantages of this invention will become apparent from the following description.

BRIEF DESCRIPTION OF DRAWING

The accompanying drawing is a pictorial view of an expansion joint illustrating the use of the end dam nosing material of this invention.

DETAILED DESCRIPTION OF PREFERRED EMBODIMENTS

Looking first to the accompanying drawing, there is shown generally at 10 an expansion joint connecting two concrete slabs 12 and 14. A bridge device 20 is anchored to both concrete slabs 12 and 14 and runs along the length of the gap 22 between the concrete slabs. End dams 28 and 30 on each side of the bridge device 20 are filled with an end dam nosing material 32 so as to provide a watertight seal between the bridge device 20 and the concrete slabs 12 and 14 and to make the expansion joint 10 flush with the upper surfaces 34 and 36 of the concrete slabs.

The end dam nosing material of this invention preferably comprises a mixture of: (a) from about 20 to about 45 percent, by weight, of an epoxy resin; (b) from about 3 to about 12 percent, by weight, of a depolymerized elastomer; (c) from about 40 to about 75 percent, by weight, of a filler component; and (d) an amount of curing agent effective to cure the epoxy resin and generate sufficient heat to cure the depolymerized elastomer. This novel end dam nosing material possesses high levels of compressive strength, tensile strength, bonding strength, flexural capabilities and resiliency. At the same time, this mixture exhibits a high level of resistance to chemical action. In addition, this novel composition provides an end dam nosing material that does not require additional external heat for curing. An exothermic reaction between the epoxy resin and the curing agent produces an amount of heat which is effective to endothermically cure the depolymerized elastomer in the composition.

In a more preferred embodiment, the end dam nosing material comprises about 25-35 percent, by weight, of an epoxy resin; about 4-10 percent, by weight, of a depolymerized elastomer; about 0.5-4 percent, by weight, of a colorant; about 50-70 percent, by weight, of filler component; and an amount of a curing agent effective to cure the epoxy resin and generate sufficient heat to cure the depolymerized elastomer. Generally speaking, this invention contemplates the use of any epoxy resin. From the standpoint of workability and flowability of the finished end dam nosing material, the preferred epoxy resins are those derived from the reaction of bisphenol-A and epichlorohydrin. Such epoxy resins are available from Dow Chemical Company under the trade designations DER 324 and DER 331. In those situations where the nosing material should have a lower viscosity, the DER 324 epoxy resin is especially preferred.

The depolymerized elastomers useful in this invention can be any rubber material, but preferably will be a natural or synthetic form of polyisoprene or synthetic butyl rubber. Although the elastomer may be in various forms (such as pellet or liquid), a liquid natural rubber (such as cis-1,4-polyisoprene) is preferred because this rubber can be more evenly distributed throughout the end dam nosing material. Such a liquid natural rubber is available from Hardman Chemical Company under the trade designation Hardman DPR 40.

The end dam nosing material of this invention optionally may contain up to about 5 percent, by weight, of a colorant. An obvious colorant is carbon black in view of the current uses for the nosing material. However, other colorants (such as titanium dioxide) or a combination of colorants can be used in this invention.

Although a variety of curing agents may be used in the end dam nosing material, the preferred curing agents are aliphatic amines, polyamide resins and amidoamine resins. An especially preferred curing agent is triethylene tetramine, available from Dow Chemical Company under the trade designation Dow Curing Agent DEH 24.

The curing agent is used in an amount which is effective to cure the epoxy resin and generate sufficient heat to cure the depolymerized elastomer. The specific amount depends upon several factors, including the particular elastomer and the availability of external heat where the end dam nosing material is being used. For example, with equivalent nosing materials, a lesser amount of curing agent will be required on a hot summer day than on a cool autumn day.

The filler component can be any conventional filler or a combination of such fillers. A coarse aggregate, silica sand or polyvinyl chloride pellets are preferred as the filler component in the end dam nosing material. As an especially preferred filler, the polyvinyl chloride pellets do not absorb large amounts of heat, so the curing agent is able to cure the elastomer in a shorter amount of time. In addition, polyvinyl chloride pellets reduce the amount of shrinkage of the end dam nosing material that normally occurs during curing. Such polyvinyl chloride pellets are available from B.F. Goodrich Company under the trade designation Geon 8700A Black 216A Vinyl Pellets.

From about 3 to about 8 percent, by weight, of coal tar optionally may be used in the end dam nosing material. The coal tar makes the end dam nosing material more compatible with asphalt construction and is also useful as a filler.

Other additives, such as stabilizers and anti-oxidants, can optionally be used in relatively small amounts to enhance certain properties of the end dam nosing material of this invention.

The following examples are designed to teach those of ordinary skill in the art how to practice this invention and to represent the best mode contemplated for carrying out this invention. These examples further demonstrate the advantageous qualities of the end dam nosing material of this invention.

EXAMPLE 1

Forty-four grams of Dow DER 331 epoxy resin and 1.0 grams of Cabot Carbon Black V9972 are poured into a rotary blade mixer. The mixing blade is raised above the level of the mixture and then rotated at 600 rpm. The blade is slowly lowered until the bottom of the fins are covered with the mixture. The speed of the mixing blade is then raised to 1000 rpm, and the blade is slowly lowered into the mixture as far as possible. Next, 10.0 grams of Hardman DPR 40 natural rubber is added to the mixture, followed by an additional 8.8 grams of Dow DER 331 epoxy resin. Next, 115.2 grams of B.F. Goodrich Geon 8700A-216A Black polyvinyl chloride pellets and 10.0 ml of Dow DEH 24 curing agent (triethylene tetramine) are added to the mixture. The entire mixture is then mixed for one hour. The blade is then raised until only the bottom of the blade is covered with the mixture. Finally, the mixer is turned off, and the blade is raised from the mixture which is then ready for use as an end dam nosing material of this invention.

EXAMPLE 2

The bonding strength of the end dam nosing material made according to the process described in Example 1 is tested according to the ASTM C882 test procedure. This test is designed to measure the bonding strength of the end dam nosing material to Portland cement concrete by measuring the load achieved prior to failure of either the concrete or the bond between the nosing material and the concrete. The highest load achieved and the type of failure are measured for three samples as shown in Table 1.

TABLE 1

| Sample I.D. | Failure Stress | Failure Type |
|---|---|---|
| A | 1,575 psi | Shear at Bond |
| B | 2,795 psi | Concrete Failure |
| C | 2,700 psi | Concrete Failure |

EXAMPLE 3

The compressive strength of the end dam nosing material made according to the process described in Example 1 is tested according to the ASTM D695 test procedure. This test is designed to measure the ultimate compressive strength of the end dam nosing material using small cube samples. Three samples of end dam nosing material are compressed until failure and the maximum load for each sample is then measured. The maximum loads achieved for those three samples are shown in Table 2.

TABLE 2

| Sample I.D. | Stress of Failure |
|---|---|
| 1 | 10,391 psi |
| 2 | 11,375 psi |
| 3 | 11,437 psi |

EXAMPLE 4

The tensile strength of the end dam nosing material made according to the process described in Example 1 is tested according to the ASTM D638 test procedure. This test is designed to measure the tensile yield strength and ultimate strength of the end dam nosing material. The tensile yield strength and the ultimate strength for three samples are shown in Table 3.

TABLE 3

| Sample I.D. | Yield Strength | Ultimate Strength |
|---|---|---|
| 1 | 4,348 psi | 4,348 psi |
| 2 | 5,650 psi | 5,650 psi |
| 3 | 4,777 psi | 4,777 psi |

EXAMPLE 5

Another test measuring the tensile strength of the end dam nosing material (made according to the process described in Example 1) is performed according to the ASTM D412 test procedure. This test is designed to determine the ultimate elongation of the end dam nosing material by determining the amount of stretch that a material will take before breaking. For example, if a material will stretch to twice its original length before breaking, the ultimate elongation of the material is 100%. The elongation of five samples of the nosing material is measured and shown in Table 4.

TABLE 4

| Sample I.D. | Elongation at Break |
|---|---|
| 1 | 236% |
| 2 | 250% |
| 3 | 222% |
| 4 | 257% |
| 5 | 250% |

EXAMPLE 6

The flexural strength of the end dam nosing material made according to the process described in Example 1 is tested according to the ASTM C580 test procedure. This test is designed to measure the flexural strength of the end dam nosing material using the 3-point loading method. The flexural modulus and deflection of the five samples as determined by the test are shown in Table 5.

TABLE 5

| Sample I.D. | Flexural Modulus | Deflection |
|---|---|---|
| 1 | 6,295 psi | 0.23" |
| 2 | 4,598 psi | 0.19" |
| 3 | 4,140 psi | 0.18" |
| 4 | 5,546 psi | 0.19" |
| 5 | 4,843 psi | 0.21" |

EXAMPLE 7

The flexural properties of the end dam nosing material made according to the process described in Example 1 are also tested, as described in the next paragraph, to determine the bonding ability of the end dam nosing material to concrete under a flexural load and to test the resistance of the system to flexural failure.

Two concrete blocks are made having a width of 3 inches, a length of 9 inches, and a height of 1½ inches. The concrete blocks are tested by ASTM D695 (see Example 3) and found to have an average compressive strength of 4,210 psi. A 1½-inch layer of the end dam nosing material is placed on the top surface of each concrete block to provide each concrete block dimensions of 3"×3"×9". Each block is tested in 3 point flexure with the layer of end dam nosing material facing upward. The test span is 7 inches, and the rate of loading is 0.5 inches of crosshead movement per minute. The load and deflection when the concrete first cracks are measured, and the load and deflection when the end dam nosing material first cracks are measured, the results of which are shown in Table 6. Even at ultimate failure (where the block cracks into two parts), the end dam nosing material does not debond from the concrete.

TABLE 6

| Sample I.D. | First Crack in Concrete | | First Crack in Nosing Material (ultimate failure) | |
|---|---|---|---|---|
| | Load | Deflection | Load | Deflection |
| A | 612 lbs | 0.06 inches | 1,495 | 0.21 inches |
| B | 722 lbs | 0.08 inches | 1,506 | 0.22 inches |

EXAMPLE 8

The hardness of the end dam nosing material (made according to the process described in Example 1) is tested according to the ASTM D2240 test procedure. This test is designed to measure the penetration hardness of the material. Ten samples of end dam nosing material are tested, and the hardness of each of those samples is shown in Table 7.

TABLE 7

| Sample I.D. | Hardness |
|---|---|
| 1 | 62 |
| 2 | 65 |
| 3 | 65 |
| 4 | 64 |
| 5 | 65 |
| 6 | 66 |
| 7 | 68 |
| 8 | 63 |

TABLE 7-continued

| Sample I.D. | Hardness |
| --- | --- |
| 9 | 64 |
| 10 | 65 |

EXAMPLE 9

The abrasion resistance of the end dam nosing material (made according to the process described in Example 1) is tested according to the ASTM D2330 test procedure. This test is designed to measure the resistance of the material to a constant force using a rotary wheel. The abrasion index ($I_n$) for three samples of the end dam nosing material is calculated according to the following formula.

$$I_n = \left(\frac{W_i - W_f}{n}\right) \times 1000$$

where:
$W_i$=initial weight of sample in milligrams
$W_f$=final weight of sample in milligrams
n=number of cycles
$I_n$=abrasion index for the designated number of cycles The abrasion index for those three samples is shown in Table 8.

TABLE 8

| Sample I.D. | $I_{1000}$ | $I_{2000}$ | $I_{3000}$ |
| --- | --- | --- | --- |
| A | 50.4 | 80.3 | 112.5 |
| B | 72.6 | 102.3 | 156.8 |
| C | 70.8 | 99.9 | 142.7 |

EXAMPLE 10

The freeze/thaw resistance of the end dam nosing material (made according to the process described in Example 1) is tested according to the ASTM C666 test procedure. This test is a qualitative test designed to determine the effect of rapid freezing and thawing on the end dam nosing material and on the bond between the end dam nosing material and concrete. Three samples of the end dam nosing material are subjected to 300 freezing/thawing cycles, and the results are observed and recorded in Table 9. No visible degradation or debonding is observed for any of the three samples of nosing material.

TABLE 9

| Sample I.D. | No. of Cycles | Results |
| --- | --- | --- |
| A | 300 | No visible degradation, No debonding |
| B | 300 | No visible degradation, No debonding |
| C | 300 | No visible degradation, No debonding |

EXAMPLE 11

The chemical resistance of the end dam nosing material (made according to the process described in Example 1) is tested according to the ASTM D543 test procedure. This test is designed to determine the effects over a period of time of various chemicals on the integrity and strength of the end dam nosing material. Twelve blocks of end dam nosing material are cured and weighed. Six test fluids are used with two blocks being immersed in each fluid. The blocks are weighed and observed after 1,3,7 and 28 days of immersion. On the 28th day, the blocks are also tested for compressive strength according to the ASTM D695 (see Example 3). The six test fluids are gasoline, diesel fuel, 30-wt. motor oil, Dextron transmission fluid, ethylene glycol and 4% calcium chloride solution.

The percent of weight change of the blocks is measured and shown in Table 10A. There is no weight change even after 28 days in the blocks immersed in calcium chloride. Ethylene glycol is the most corrosive fluid and reduces the weight of the blocks by 2.7%. Gasoline and diesel oil are the next most corrosive fluids, corroding the blocks by 1.6% and 1.0%, respectively, after 28 days. Motor oil has a very slight corrosive effect after 28 days with a weight loss of 0.7%. Transmission fluid has an even less corrosive effect with a weight loss of 0.3% after 28 days. The data in Table 10A represents the average values for each pair of immersed blocks.

The change in the compressive strength of the immersed blocks is measured as a percent of the compressive strength of a control block of end dam nosing material. The compressive strength change is shown in Table 10B. None of the test fluids reduces the compressive strength of the blocks more than 10%. No visible degradation of any of the immersed blocks is observed.

TABLE 10A

| Test Medium | 1 Day | 3 Days | 7 Days | 28 Days |
| --- | --- | --- | --- | --- |
| Gasoline | 0.0 | −0.2 | −1.1 | −1.6 |
| Diesel Oil | 0.0 | +0.1 | −0.6 | −1.0 |
| Motor Oil | 0.0 | −0.0 | −0.3 | −0.7 |
| Transmission Fluid | 0.0 | −0.0 | −0.1 | −0.3 |
| Ethylene Glycol | 0.0 | −0.3 | −2.3 | −2.7 |
| Calcium Chloride | 0.0 | 0.0 | 0.0 | 0.0 |

TABLE 10B

| Test Medium | Compressive Strength Change (% of Control) 28 Days |
| --- | --- |
| Gasoline | 94% |
| Diesel Oil | 92% |
| Motor Oil | 98% |
| Transmission Fluid | 97% |
| Ethylene Glycol | 90% |
| Calcium Cloride | 102% |

The nosing materials of this invention can be effectively used in expansion joints and, in such applications, provide high levels of bonding strength, tensile strength, compressive strength, flexural capabilities and resiliency, as well as a high level of resistance to chemical action.

The foregoing description relates to certain preferred embodiments of the present invention, and changes and modifications may be made without departing from the spirit and scope of the invention as defined in the following claims.

I claim:

1. An end dam nosing material consisting essentially of an epoxy resin, a liquid depolymerized elastomer, polyvinyl chloride pellets and an amount of curing agent effective to cure the epoxy resin and generate sufficient heat to cure the liquid depolymerized elastomer.

2. An end dam nosing material consisting essentially of:

(a) from about 20 to about 45 percent, by weight, of an epoxy resin;
(b) from about 3 to about 12 percent, by weight, of a liquid depolymerized elastomer;
(c) up to about 5 percent, by weight, of a colorant;
(d) from about 40 to about 75 percent, by weight, of polyvinyl chloride pellets; and
(e) an amount of curing agent effective to cure the epoxy resin and generate sufficient heat to cure the liquid depolymerized elastomer.

3. An end dam nosing material consisting essentially of a liquid depolymerized elastomer. and epoxy resin which, when cured with a curing agent, generates sufficient heat to cure the liquid depolymerized elastomer, and polyvinyl chloride pellets.

4. An end dam nosing material comprising a liquid depolymerized elastomer, an epoxy resin which, when cured with a curing agent, generates sufficient heat to cure the liquid depolymerized elastomer, and polyvinyl chloride pellets.

* * * * *